(12) United States Patent
Huang et al.

(10) Patent No.: US 9,010,152 B2
(45) Date of Patent: Apr. 21, 2015

(54) ION TRANSPORT MEMBRANES IN FLOAT GLASS MANUFACTURING

(71) Applicant: Air Liquide, Societe Anonyme pour Etude et Exploitation des Procedes Georges Claude, Paris (FR)

(72) Inventors: Wei Huang, Newark, DE (US); Youssef Joumani, Houston, TX (US); Remi Pierre Tsiava, Houston, TX (US); Bhadra S. Grover, Sugar Land, TX (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 297 days.

(21) Appl. No.: 13/731,970

(22) Filed: Dec. 31, 2012

(65) Prior Publication Data

US 2014/0182336 A1    Jul. 3, 2014

(51) Int. Cl.
*C03B 18/02* (2006.01)
*C03B 18/20* (2006.01)
*C03B 5/16* (2006.01)
*C03B 5/235* (2006.01)
*C01B 13/02* (2006.01)

(52) U.S. Cl.
CPC ............ *C03B 18/20* (2013.01); *C03B 5/2353* (2013.01); *C01B 13/0251* (2013.01)

(58) Field of Classification Search
CPC .......................... C03B 18/20; C03B 5/2353
USPC .......... 65/32.1, 32.5, 99.2, 134.4, 157, 182.1, 65/182.3
See application file for complete search history.

(56) References Cited

U.S. PATENT DOCUMENTS

| 5,753,007 | A | * | 5/1998 | Russek et al. ..................... 95/41 |
| 5,888,265 | A | * | 3/1999 | Bonaquist et al. ............... 65/157 |
| 6,783,750 | B2 | | 8/2004 | Shah et al. |
| 8,268,041 | B2 | | 9/2012 | Ekiner et al. |
| 2012/0135362 | A1 | * | 5/2012 | Bioul et al. .................. 432/180 |
| 2012/0135363 | A1 | * | 5/2012 | Bioul et al. .................. 432/180 |

FOREIGN PATENT DOCUMENTS

WO        2011015616 A1    2/2011

* cited by examiner

*Primary Examiner* — Jason L Lazorcik
(74) *Attorney, Agent, or Firm* — Christopher J. Cronin

(57) ABSTRACT

Ion transport membranes are integrated with a glass melting furnace and a float glass bath. Only feeds of air, steam and hydrocarbon are necessary for producing hot oxygen for the melting furnace and a mixture of nitrogen, carbon dioxide, and hydrogen for the float glass bath.

3 Claims, 1 Drawing Sheet

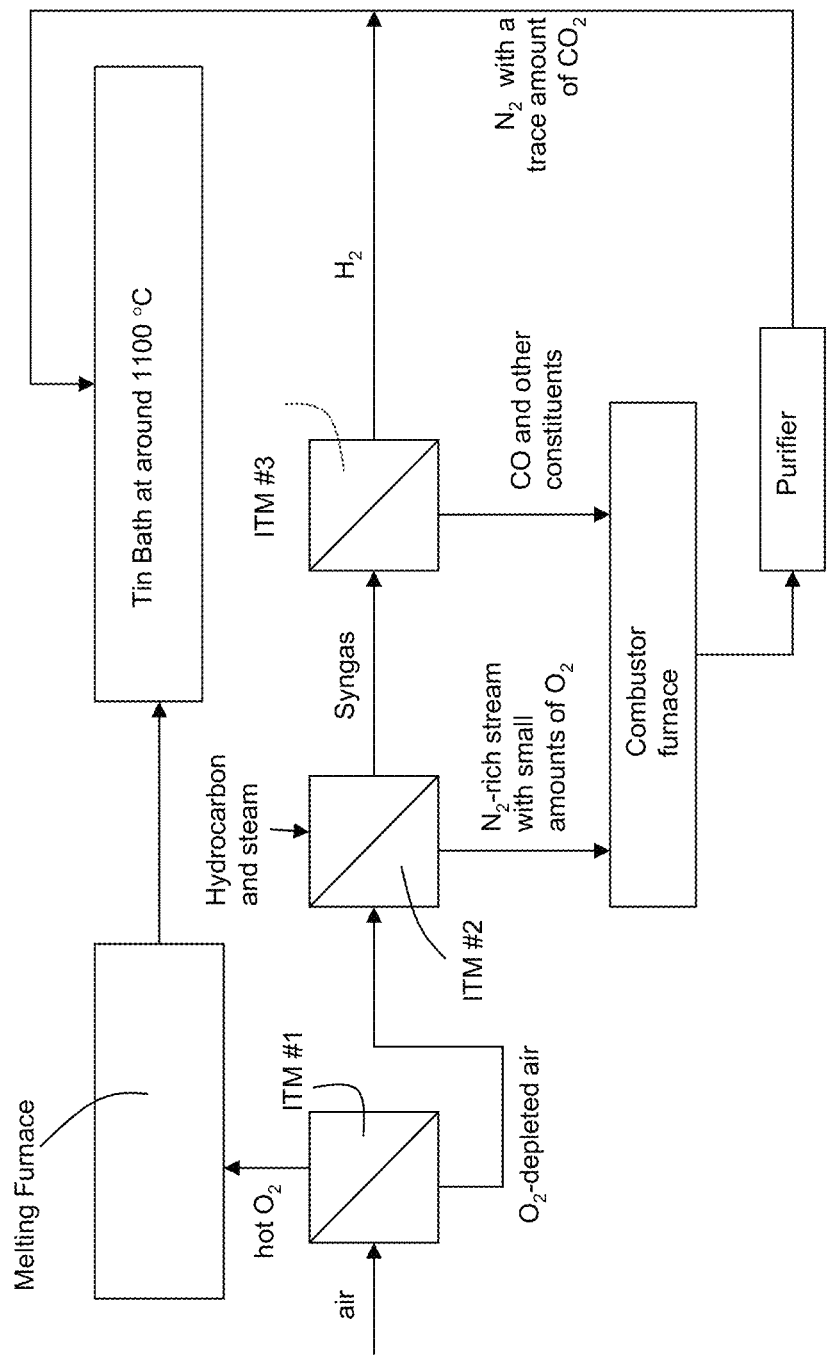

ION TRANSPORT MEMBRANES IN FLOAT GLASS MANUFACTURING

CROSS-REFERENCE TO RELATED APPLICATIONS

None.

BACKGROUND

1. Field of the Invention

The present invention relates to ion transport membranes and float glass furnaces.

2. Related Art

Nowadays, the glass industry can be divided into four product segments: Flat glass (windows, automobile windshields, and picture glass); Container glass (bottles, jars, and packaging); Glass fiber (insulation/fiberglass, textile fibers for material reinforcement, and optical fibers); and Specialty glasses (pressed/blown glass such as table and ovenware, flat panel display glass, light bulbs, television tubes, and scientific and medical applications.

Glass manufacture, regardless of the final product, requires four major processing steps: batch preparation, melting and refining, forming, and post forming. Batch preparation is the step where the raw materials for glass are blended to achieve the desired final glass product. While the main components in glass are high-quality sand (silica), limestone, and soda ash, there are many other components that can be added. The details of the batch material are well known in the art and need not be discussed here. Once the mixed batch is charged to a melting furnace, melting of the batch may be accomplished in many different types and sizes of furnaces, depending upon the quantity and type of glass to be produced. The melting step is complete once the glass is free of any crystalline materials. Refining (also referred to as fining) is the combined physical and chemical process occurring in the melting chamber during which the batch and molten glass are freed of bubbles, homogenized, and heat conditioned. After refining, the molten glass is sent to forming operations. Forming is the step in which the final product begins to take shape, and may involve casting, blow forming, sheet forming, fiberization, or other processes. Forming processes vary widely, depending on the type of glass being manufactured. Some products require post-reforming procedures, which vary widely depending upon the products. The post-reforming procedures may include processes that alter the properties of the glass, such as annealing, tempering, laminating and coating.

To make glass, one necessary condition is to supply high-temperature energy to the process. This can be done by flames generated through burners installed above the glass bath or electrically by using electrodes submerged in the glass bath. Flames of course result from the combustion of a fuel (such as natural gas, oil, or coal) and an oxidant (such as air, oxygen-enriched air, or high purity oxygen). Most glass furnaces use air as an oxidant. In some conditions, high purity oxygen is preferred despite the extra cost due to the oxygen price. Reducing pollutants emissions (such as NOx, Sox) or greenhouse gases ($CO_2$), fuel consumption, and capital investment are typical advantages associated with the use of high purity oxygen.

In the industrial gas industry, large amounts of oxygen are typically supplied by one of our methods: bulk liquid tanks which are filled regularly by bulk liquid trucks, vacuum swing adsorption (VSA) which provides low purity oxygen at low pressure, an oxygen pipeline, or a dedicated air separation unit. Supply by bulk liquid tanks is not practice for furnace powers higher than 2 MW (≈7 MMBtu/hr) due to the sheer number of truck deliveries needed. It should be noted that flat glass furnaces are operated usually at 35 MW. VSAs are limited in capacity (10 MW is maximum allowable level). While oxygen pipelines are ordinarily considered the most appropriate, their application to glass furnaces is limited to where they are located. Additionally, the risk of pipeline failure is always taken into account. Finally, a dedicated ASU is ordinarily considered an oversized solution for 35 MW glass furnaces.

Some have proposed to reduce the fuel and/or oxygen requirements of glass furnaces by preheating air or oxygen. In air-fired furnaces, flue gases are used to preheat air to 600° C. (1100° F.) or up to 1250° C. (2300° F.). In oxy-fired furnaces, such a technique is difficult to implement because pure oxygen is a very hazardous material and ignition of a mixture with oxygen can jeopardize the furnace. One particular solution from Air Liquide involves the preheating of oxygen and natural gas with hot flue gas via an intermediate heat exchange fluid of air. In this manner, oxygen may be preheated to 550° C. and natural gas to 450° C. Fuel savings of about 10% can be realized with implementation of this technology.

Some glassmakers and engineering companies sells boilers and power station using the fumes energy but the yield is still too low to be really profitable.

Another way of producing oxygen on-site that has not yet been commercially implemented is the use of high temperature ion transport membranes (ITMs). ITMs are particular types of solid electrolytes that are inorganic crystalline materials that, while being impermeable to gases, have the property of conducting oxygen ions ($O^{2-}$) or protons ($H^+$) through vacancies in its crystalline structure. In order to maintain electric charge neutrality, certain solid electrolyte membranes must include a separate electron-conductive path. Ones that conduct oxygen ions are called oxygen transport membranes while ones that conduct protons are called hydrogen transport membranes. Other solid electrolyte membranes are made of materials that, at elevated temperatures, can simultaneously conduct oxygen ions and electrons or simultaneously conduct protons and electrons. Examples of these oxygen ion conductive materials include certain perovskites such as $La_xSr_{1-x}CoO_{3-y}$, $La_xSr_{1-x}FeO_{3-y}$, and $La_xSr_{1-x}Fe_yCo_{1-y}O_{3-z}$ are examples of mixed conductors. One example of a proton conductive material is a cermet, a composite of metal and sintered ceramic. Other examples of proton conductive materials include the single-phase mixed metal oxide materials of the formula: $AB_{1-x}B'_xO_{3-y}$ wherein A is selected from Ca, Sr or Ba ions, B is selected from Ce, Zr, Ti, Tb, Pr, or Th ions, B' is selected from Yb, In, Ru, Nd, Sc, Y, Eu, Ca, La, Sm, Ho, Tm, Gd, Er, Zr, Gb, Rh, Ti, V, Cr, Mn, Fe, Co, Ni, Cu, Al, Ga, or In ions (or combinations thereof), x is greater than or equal to 0.02 and less than or equal to 0.5, and y is such that the electrical neutrality of the crystal lattice is preserved. These oxygen ion or proton conductive membranes are often called mixed oxide conducting membranes.

Other terms used to describe these membranes include mixed ion and electron(ic) conducting membranes, mixed proton and electron(ic) conducting membranes, ion transport membranes, oxygen transport membranes, hydrogen transport membranes, solid state membranes, mixed conducting metallic oxide, and mixed conducting multicomponent metallic oxide membranes. Regardless of the name utilized, these materials have the ability to transport oxygen ions ($O^{2-}$) or protons ($H^+$) through their crystalline structure.

Using oxygen conductive mixed oxide conducting membranes as an example, at elevated temperatures, the mixed oxide conducting material contains mobile oxygen ion vacancies that provide conduction sites for transport of oxygen ions through the material. The membrane is in part driven by a difference in oxygen partial pressure across the membrane. When the surface of the membrane is exposed to the relatively higher $O_2$ partial pressure gaseous atmosphere, the molecular oxygen in the gaseous atmosphere adjacent the surface reacts with electrons and the oxygen vacancies in the crystalline structure of the material to product oxygen ions $O^{2-}$. The oxygen anions diffuse through the mixed conductor material to the opposite surface of the membrane which is exposed to the relatively lower $O_2$ partial pressure. At the opposite surface, the oxygen anions give up their electrons and form molecular oxygen. The molecular oxygen then diffuses into the gaseous atmosphere adjacent the surface of the membrane exposed to the lower $O_2$ partial pressure gaseous atmosphere. These materials transport oxygen ions selectively, and assuming a defect-free membrane and lack of interconnecting pores, they can act as a membrane with an infinite selectivity for oxygen.

Proton conductive mixed oxide conducting membranes operate in much the same way and are similarly in part driven by a difference in hydrogen partial pressure across the membrane. When the surface of the membrane is exposed to the relatively higher $H_2$ partial pressure gaseous atmosphere, hydrogen molecules disassociate into protons and electrons which migrate through the membrane to the opposite surface where they recombine into hydrogen molecules. The thus-formed hydrogen molecules then diffuse into the gaseous atmosphere adjacent the membrane surface. Similar to oxygen conducting mixed oxide conducting membranes, these proton conducting membranes offer the possibility of infinite selectivity for hydrogen.

In oxygen transport membranes, air is compressed to about 16 bars, heated to 900° C., and fed to the ITM and hot oxygen permeates through the membrane. The permeate pressure must be kept low in order to provide the necessary oxygen partial pressure driving force across the membrane. A recovery of 50% to 80% of the oxygen in the air is considered feasible. ITMs can thus provide oxygen at a temperature of around 900° C. and at a low pressure ranging from 0.5 bara to 2 bara. The product oxygen can be withdrawn at different pressures, such as 0.5 bara, 0.7 bara, 1.1 bara, or 2.2 bara in order to minimize recompression energy. Oxygen produced at high temperature and low pressure does not require further preheating and is suitable for use in the glass furnace. In addition to the product oxygen, a hot non-permeate gas containing nitrogen and non-recovered oxygen is available at 900° C. and 16 bars. The use of the non-permeate gas is a challenge since it may drag the efficiency down if not treated properly.

In flat glass furnaces, melted glass exits the glass bath at around 1100° C. (2220° F.). At one meter wide and ten centimeters thick, the melted glass flows on top of a tin bath. At this temperature, the tin reacts in presence of $O_2$ in the atmosphere to produce SnO vapor. Because of high levels of SnO equilibrium vapor, a significant quantity of SnO can be formed through condensation of the SnO vapor at the cold spots in the roof. This solid condensate falls down on the glass when it grows to a certain size and mechanically damages the glass. Thus a reductive atmosphere is typically used in order to protect the Sn from oxidation.

The atmosphere above the tin bath is ordinarily composed of 90% $N_2$ and about 10% $H_2$. About 1000 $Nm^3/h$ of $N_2$ and 100 $Nm^3/h$ of $H_2$ are needed to fulfill the space above the glass. Such high quantities are usually provided by pipe.

While each of the above technologies is interesting in its own right, glass manufacturers utilizing float glass furnaces still strive to reduce costs. Thus, there is a need to provide a new technology which preserves the above advantages while driving down costs.

SUMMARY OF THE INVENTION

There is disclosed a method for producing float glass that comprises the following steps. Air is fed to a first ion transport membrane which produces a stream of pure oxygen and a stream of oxygen-depleted air. The stream of pure oxygen is fed to a glass melting furnace. A mixture of steam and a hydrocarbon fuel is fed to one side of a second ion transport membrane and the stream of oxygen-depleted air is fed to the other side of the second oxygen transport membrane to produce a stream of syngas and a nitrogen-rich stream. The stream of syngas is fed to a third ion transport membrane to produce a stream of pure hydrogen and a stream of hydrogen-depleted syngas. The nitrogen-rich stream and the hydrogen-depleted syngas stream are fed to a combustor to produce an oxygen-free stream of nitrogen and carbon dioxide. $H_2O$, CO, and hydrocarbon are removed from the products of combustion produced by the combustor to produce a purified oxygen-free stream of nitrogen and carbon dioxide. The stream of pure hydrogen and the purified stream of nitrogen and carbon dioxide are mixed. The mixed stream is fed to the surface of a float glass bath downstream of the glass melting furnace.

There is also disclosed an installation for producing float glass, comprising: a float glass bath downstream of a glass melting furnace; a compressor; a first ion transport membrane receiving air from the compressor and producing pure oxygen and oxygen-depleted air, burners of the glass melting furnace receiving the pure oxygen; a second ion transport membrane receiving a mixture of a steam and a hydrocarbon fuel on one side and the oxygen-depleted air on the other side; a third ion transport membrane receiving syngas from the second ion transport membrane; a combustor receiving a nitrogen-rich stream from the second ion transport membrane and hydrogen-depleted syngas from the third ion transport membrane; and a purifier receiving a stream of nitrogen and carbon dioxide from products of combustion produced by combustion of the nitrogen-rich stream and the hydrogen-depleted syngas at the combustor. The purifier removes $H_2O$, CO, and hydrocarbon from the products of combustion. The float glass bath receives a mixed stream of a particle free stream of nitrogen and carbon dioxide from the particle filter and the pure hydrogen from the third ion transport membrane.

The method and/or installation may include one or both of the following aspects:
  heat is exchanged between products of combustion produced at the glass melting furnace and low pressure air at a recuperator to produce a stream of hot, low pressure air; and heat is exchanged between the stream of hot, low pressure air and the high pressure air to be fed to the first ion transport membrane at a heat exchanger.
  one or more of the ion transport membranes is heated with radiant heat from the glass melting furnace.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

The FIGURE is a schematic of the inventive process/system.

DESCRIPTION OF PREFERRED EMBODIMENTS

For producing an environmental friendly flat glass, it is necessary to provide $O_2$, $H_2$ and $N_2$. In order to get an efficient oxy-furnace it is also necessary to recover thermal energy from the products of combustion in the furnace. Our invention combines a heat recovery system with an on-site $N_2$—$O_2$ production system.

In this invention, we are focusing on the integration of ITMs in the flat glass manufacturing process. An ITM is a potential $O_2$-supplying unit for the oxy-combustion burners in the glass melting furnace as the resultant low pressure, hot $O_2$ is particularly suitable as an oxidant. In this way, direct use of the hot $O_2$ product from the ITM increases the energy efficiency of the glass manufacture process. The ITM also generates large amounts of a hot, high pressure non-permeate stream of oxygen-depleted air containing large amounts of $N_2$ as well as unrecovered $O_2$. In this invention, we convert the non-permeate stream to several useful products, which can be used directly in the production of float glass. In the invention, we propose the use of two oxygen transport membranes and one hydrogen transport membranes. These types of membranes are well known in the art and different materials for use in producing streams of pure oxygen or pure hydrogen or suitable for use as syngas reactors are described in U.S. Pat. No. 8,268,041, the contents of which are disclosed herein in their entirety. While U.S. Pat. No. 8,278,041 focuses upon ITMs made of hollow fibers, the ITMs of the invention can be of any configuration known in the art.

As best illustrated in the FIG, first and second ITM units placed in series in the process. The first ITM receives air from a compressor (not shown) and produces a stream of hot, pure oxygen and a stream of hot, oxygen-depleted air. In order to maintain the temperature of the first ITM at a level allowing its use as an oxygen transport membrane, the high pressure air may first be heat-exchanged with a hot, low pressure air stream at a heat exchanger. Such a heat exchanger is available from Air Liquide under the name HeatOx. The low pressure, hot air stream may be obtained through heat exchange with flue gas at a recuperator associated with the glass melting furnace to heat the low pressure, hot air to a temperature of about 700-800° C. The resulting stream of hot, pure oxygen permeate is fed to the burners of the glass melting furnace.

The $O_2$-depleted non-permeate stream coming from the first ITM is fed to one side of a second ITM. A mixture of steam and a hydrocarbon are fed to the other side of the second ITM. Oxygen from the $O_2$-depleted non-permeate stream disassociates at the surface of the membrane into oxygen ions and the oxygen ions migrate through the membrane to the other side where it reacts with the hydrocarbon and steam to produce a stream of syngas. The $O_2$-depleted non-permeate stream is further depleted in oxygen by this action to produce a nitrogen-rich non-permeate stream containing a small amount of oxygen. The temperature of the second ITM may be maintained by feeding it with the hot $O_2$-depleted non-permeate stream from the first ITM. This may be supplemented with radiant heat from the glass melting furnace.

The syngas from the second ITM is fed to a third ITM. In contrast to the first and second ITMs, the third ITM is a hydrogen transport membrane. Hydrogen from the syngas disassociates at the surface of the membrane into protons which migrate through the membrane and reform on the other side as molecular hydrogen, $H_2$ to produce a pure hydrogen permeate. The resultant $H_2$-depleted syngas (mainly CO) exits the third ITM as a non-permeate. The third ITM works at high temperature (i.e., 600-900° C.), so there is no need to cool the syngas stream down before collecting the pure $H_2$ stream. The temperature of the third ITM may be maintained by feeding it with the hot syngas stream from the second ITM. This may be supplemented with radiant heat from the glass melting furnace. Ne may optionally be used as a purge gas in the ceramic $H_2$ membranes for improving the $H_2$ recovery.

The $H_2$-depleted syngas from the third ITM and the nitrogen-rich stream from the second ITM are then combusted at a combustor to produce a combustion product stream rich in nitrogen and carbon dioxide at a temperature of about 1100-1400° C. $H_2O$, CO, and hydrocarbon may be removed from the products of combustion by a purifier operated at high temperature. High temperature purification techniques are well known in the art and their details need not be duplicated herein.

The purified stream of nitrogen and carbon dioxide is then mixed with the stream of pure hydrogen from the second ITM. The mixture is then introduced at the surface of the float glass bath in order to provide a reducing atmosphere that avoids the formation of SnO.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for producing float glass, comprising:
    feeding air to a first ion transport membrane which produces a stream of pure oxygen and a stream of oxygen-depleted air;
    feeding the stream of pure oxygen to a glass melting furnace;
    feeding a mixture of steam and a hydrocarbon fuel to one side of a second ion transport membrane and the stream of oxygen-depleted air to the other side of the second oxygen transport membrane to produce a stream of syngas and a nitrogen-rich stream;
    feeding the stream of syngas to a third ion transport membrane to produce a stream of pure hydrogen and a stream of hydrogen-depleted syngas;
    feeding the nitrogen-rich stream the hydrogen-depleted syngas stream to a combustor to produce an oxygen-free stream of nitrogen and carbon dioxide;
    removing $H_2O$, CO, and hydrocarbon from the products of combustion produced by the combustor to produce a purified oxygen-free stream of nitrogen and carbon dioxide;
    mixing the stream of pure hydrogen and the purified stream of nitrogen and carbon dioxide; and
    feeding the mixed stream to the surface of a float glass bath downstream of the glass melting furnace.

2. The method of claim 1, further comprising the steps of:
    exchanging heat between products of combustion produced at the glass melting furnace and low pressure air at a recuperator to produce a stream of hot, low pressure air; and
    exchanging heat between the stream of hot, low pressure air and the high pressure air to be fed to the first ion transport membrane at a heat exchanger.

3. The method of claim 1, wherein one or more of the ion transport membranes is heated with radiant heat from the glass melting furnace.

\* \* \* \* \*